Patented Apr. 7, 1953

2,634,279

UNITED STATES PATENT OFFICE 2,634,279

PREPARATION OF MONOGLYCERIDES

Noel H. Kuhrt, Rochester, N. Y., assignor, by mesne assignments, to Eastman Kodak Company, Rochester, N. Y., a corporation of New Jersey No Drawing. Application July 16, 1949, Serial No. 105,272

3 Claims. (Cl. 260—410.7)

This invention relates to a process of treating fatty material and is particularly concerned with the preparation and recovery of fatty acid partial esters of polyhydric alcohols.

Fatty acid partial esters of polyhydric alcohols are prepared by reacting fatty material with an alcohol in the presence of an ester-interchange catalyst at elevated temperatures.

It is an object of this invention to provide a commercially feasible method of obtaining a fatty acid partial ester of a polyhydric alcohol.

Another object of the invention is to prepare such partial ester in the presence of an ester-interchange catalyst and to recover said partial ester while the catalyst is still in active form.

It is a further object of the invention to cause maximum conversion of fatty material to a partial ester and to recover substantially all of the partial ester thus formed.

It is also an object of the invention to prevent reversion of partial ester formed by alcoholysis of fatty material.

Another object of the invention is to provide a process for preparing and recovering fatty acid partial ester in enhanced yield.

Another object of the invention is to obtain monoglycerides of high purity in enhanced yield.

Other objects of the invention will be apparent from the description and claims which follow.

These and other objects of this invention are attained by reacting fatty material and an alcohol in the presence of an ester-interchange catalyst under conditions causing substantial formation of fatty acid partial ester, and thereafter recovering substantially all of the desired partial ester formed in the reaction, while maintaining the catalyst in active form, by separating the desired partial ester from the composition resulting from the reaction during the reversion time interval before substantial reversion is effected.

When fatty material and alcohol are reacted in the presence of an ester-interchange catalyst, an equilibrium system is established. The equilibrium thus attained is a dynamic equilibrium subject to shifting to a new equilibrium system upon change in conditions of the system. Thus the equilibrium composition resulting from the reaction will contain unreacted fatty material, unreacted alcohol, partial esters and active catalyst in definite proportions. Removal of a portion of the alcohol will initiate a shift in equilibrium with reversion of partial ester to a more stable polyester form and a consequent liberation of alcohol.

I have found that the rapidity with which the equilibrium shifts is a function of the temperature of the composition and relative concentration of components thereof including the presence of active catalyst. The period of time necessary for substantial reversion of partial ester to occur is denoted in the reversion time interval and I have found that under correlated conditions the reversion time interval is a finite period of time.

In general, higher temperatures will accelerate reversion of partial ester in a composition from which some alcohol has been removed. In cases where the alcohol is only sparingly soluble in the composition, however, lowering the temperature will cause separation of alcohol from the composition with a resultant increased unbalance of the components from the initial equilibrium concentrations.

I have found, however, that if partial ester is separated during the reversion time interval, substantial reversion is obviated and substantially all of the partial ester initially formed by the reaction is recovered. The interrelationship of the factors affecting the reversion of partial ester as determining the reversion time interval is readily illustrated by reference to the preparation of monoglyceride by the alcoholysis of soybean oil with glycerine in the presence of a metal soap ester interchange catalyst.

The reaction is effected with an excess of glycerine present, at elevated temperatures and for a time sufficient to establish an equilibrium composition containing optimum amounts of monoglyceride. The resulting equilibrium composition can be maintained for an indefinite period by maintaining the reaction temperature and preventing a change in concentration of the components thereof through separation or decomposition. Thus, when reaction is effected at 250° C. and the composition resulting therefrom is maintained at a constant concentration at that temperature, the system is in a metastable condition and the reversion time interval is infinite.

It is necessary, however, to recover the monoglyceride present in the composition, either together with or free from glycerine. When the composition is cooled, glycerine separates from the composition, the metastability of the system is destroyed, and reversion of the monoglyceride is initiated. When the composition is rapidly cooled from a reaction temperature of 250° C. to a lower temperature such as 100° C., however, the lowered temperature slows the reversion of partial ester and the reversion time interval before substantial reversion occurs is several hours as evidenced by the fact that 10% reversion is effected only after a lapse of at least 8 hours at 100° C.

The resulting glycerine-depleted composition contains monoglyceride in admixture with active catalyst, diglyceride, and unreacted oil comprising mostly triglyceride. I have found that separation of monoglyceride from the unstable system without substantial reversion, that is, within the reversion time interval, is complicated by the fact that elevated temperatures necessary for distillation greatly accelerate reversion and thus foreshorten the reversion time interval.

I have found, however, that monoglyceride is successfully separated without substantial reversion if successive increments of the composition are spread in a thin film and subjected to vacuum effective to distill monoglyceride therefrom. In this way, the total distillation time for any given increment of composition is at most not more than 5 minutes and usually only a few seconds for a single distillation. Monoglyceride is thus separated from the composition within the reversion time interval, and hence without substantial reversion, since the partial ester reversion is 10% only after a lapse of about 10 minutes at 200° C.

Thus, by means of this invention, monoglycerides are obtained substantially without reversion by rapidly cooling an equilibrium composition to a temperature sufficiently below reaction temperature to cause a substantial proportion of the unreacted glycerine to separate, maintaining the composition at such lowered temperature for a time sufficient to allow phase separation, whereby the glycerine can be drawn off, but substantially less than the reversion time interval, and thereafter separating monoglyceride from the resulting glycerine-depleted composition by spreading the composition in a thin film at a temperature substantially below the decomposition temperature of the catalyst and subjecting the film to vacuum effective to distill monoglyceride therefrom.

The distillation residue contains residual fatty material including di- and tri-glycerides, and active catalyst and can thereafter be recycled for additional conversion to monoglyceride. The distillate contains monoglyceride and glycerine which did not separate upon cooling the composition. If desired other partial esters such as diglycerides can be similarly recovered without substantial reversion by accomplishing separation during the reversion time interval.

Separation of monoglyceride or other partial ester is also effected within the reversion time interval by effecting reaction at a suitable elevated temperature and without substantially lowering the temperature of the resulting composition, spreading successive portions of the composition in a thin film on an evaporating surface under vacuum effective to distill the monoglyceride or other partial ester and flash distilling both alcohol and monoglyceride away from the active catalyst and residual unreacted oil and condensing and cooling the distillate. By simultaneous flash distillation of both the alcohol and monoglyceride, distillation temperatures as high as 400° C. may be used since the relative concentrations of alcohol and monoglyceride are not changed and the reversion time interval is a function of temperature and presence of active catalyst. By utilizing flash distillation, the distillation is almost instantaneous or at most a few seconds in duration which I have found is considerably less than the reversion time interval since 10% reversion occurs only after about 1 to 2 minutes at 400° C.

Recovery of monoglyceride is preferably effected in such manner that it contains not more than 1% glycerine. This is accomplished in accordance with this invention by reacting soybean oil and glycerine, for example as set forth hereinabove, cooling the resulting composition from reaction temperature to below about 100° C. and allowing the cooled composition to stand until a separate glycerine layer is formed, the total cooling and standing time preferably being not more than one hour, drawing off the glycerine layer, thereafter vacuum distilling off substantially all residual glycerine remaining in the glycerine-depleted composition from a film thereof under conditions ineffective to distill substantial monoglyceride therefrom, and thereafter effecting vacuum film distillation of the monoglyceride from the substantially glycerine-free composition. The separation of glycerine by vacuum distillation is preferably effected at pressures of 10 microns at 90° C. to 300 microns at 150° C. without substantial distillation of monoglyceride. The monoglyceride is then preferably distilled at pressures of from 1 micron at 150° C. to 10 microns at 200° C. and desirably at about 3 microns at about 170° C. The entire treatment of the composition resulting from the reaction is thus effected within the reversion time interval and substantial reversion is obviated whereby substantially all of the monoglyceride formed by the reaction is recovered. This is made possible by my discovery that reversion occurs after reaction and before separation of partial ester as well as during separation of partial ester and that the entire treatment must be effected before the reversion time interval has elapsed.

Thus, by means of this invention, a maximum amount of partial ester is formed, the resulting reaction mixture is treated so that the partial ester does not revert following the reaction, and separation of the partial ester is effected while the catalyst is maintained in active form suitable for re-use and without reversion of the partial ester during the separation step.

Any of the partial esters prepared by the alcoholysis of fatty material can be prepared and recovered in accordance with this invention. The fatty material suitably can be any of the natural or synthetic fatty acid compounds including fatty acids or fatty acid esters or mixtures thereof and including either solid or liquid fats and fatty oils. The fatty acid compounds include esters of either monohydric or polyhydric alcohols or mixtures of such esters and preferably are the fatty acid compounds having from about twelve to about twenty carbon atoms in the fatty acid chain although fatty acid compounds of from eight to about twenty-six carbon atoms may be employed.

Suitable fatty materials include marine oils such as fish oils and whale oil, animal fatty materials such as tallow, wool grease, hydrogenated tallow and the various other animal fats and fatty oils, and vegetable oils such as soybean oil, cottonseed oil, coconut oil, palm oil, corn oil, olive oil, castor oil, peanut oil and the like, as well as such fatty materials as the hydrogenated vegetable oils or shortenings. Partial esters of particularly good quality for certain uses are prepared by alcoholysis of free fatty acids such as stearic acid, oleic acid, lauric acid, palmitic acid, myristic acid and the like.

The alcoholysis or esterification is effected by reacting these or other fatty materials with an alcohol in the presence of an ester-interchange catalyst. The alcohols employed in the reaction include both monohydric or polyhydric alcohols; but where a monohydric alcohol such as methyl or ethyl alcohol is employed, it is reacted with a fatty acid ester of a polyhydric alcohol to give a partial ester. Alcohols which are particularly suitable for alcoholysis are the aliphatic alcohols including the aryl-substituted aliphatic alcohols and desirably the lower saturated polyhydric alcohols. Thus suitable alcohols include the polyhydroxy alkanes such as glycerol, sorbitol, mannitol and the like; ether alcohols such as diglycerol, polyglycerols and the like; alkylene glycols such as trimethylene glycol, ethylene glycol, propylene glycol, polyethylene glycols, polypropylene glycols and the like; as well as such other alcohols as pentaerythritol and the like.

The alcoholysis or esterification reaction is carried out in the presence of any suitable ester-interchange catalyst. The catalysts include both acid and alkaline catalysts and particularly suitable catalysts for the preparation of glyceride partial esters are the metal compounds, desirably oxides or hydroxides, which react with fatty acid present in the reaction mixture to form metal soaps which serve as ester-interchange catalysts. These metal catalysts are preferably alkali or alkaline earth catalysts. Monovalent metal compounds which form metal soaps include sodium hydroxide, sodium methylate, sodium carbonate and the like.

The metal catalysts preferably employed in practising this invention are the bivalent metal compounds such as calcium oxide, calcium hydroxide, barium oxide and the like because of the particularly good yields of partial ester and the desirable solubility characteristics of the bivalent metal soaps in the reaction mixture.

The catalysts suitable for use include any of the well-known ester-intechange catalysts which do not distill simultaneously with the desired partial ester and include, in addition to the metal salts, either organic or inorganic acid catalysts such as alkyl sulfuric acids, aryl sulfonic acids and the like. Other well-known ester-interchange catalysts include tetramethyl ammonium hydroxide, aluminum chloride and boron fluoride which are employed in accordance with well-known alcoholysis practices.

The alcoholysis reaction is preferably carried out with an excess of alcohol over the amount necessary to form the desired partial ester with as much as two to five volumes excess or more being desirably employed although stoichiometric amounts or less are employed successfully. The amount of catalyst employed is varied in accordance with well-known practice as for example from 0.01 mole to 0.5 mole per equivalent of fatty material in the reaction.

The reaction is effected in accordance with this invention under conditions effective to cause substantially maximum formation of the desired partial ester. The minimum necessary reaction temperature will depend upon the materials being reacted and the partial ester desired. Generally, however, the reaction temperature necessary for maximum conversion to partial ester is in the range of 180° C. to 300° C. although reaction can be effected in some cases at from 20° C. to 400° C. For example, in the alcoholysis of soybean oil, the reaction is preferably effected at or above 250°–260° C. and more desirably at about 285° C. but reaction is successfully effected at 180°–200° C.

The time of reaction will vary depending upon the reaction conditions but the alcoholysis is preferably carried on for from ½ to 2 hours after the reaction temperature has been reached. Excessive reaction times cause distillation out of the reaction mixture of more volatile components such as the alcohol and results in reversion of a portion of the partial ester to re-establish the equilibrium conditions unless precautions are taken to prevent loss. Prolonged reaction times also increase the danger of decomposition of some of the components.

When optimum formation of the desired partial ester has been effected, the partial ester formed is recovered in accordance with this invention without loss of any substantial amount thereof.

The separation of desired partial ester from the mixture resulting from the reaction, including the partial ester and active catalyst, is effected by spreading the mixture in a thin film on an evaporation surface and maintaining the mixture while in film form at a temperature substantially below the decomposition temperature of the catalyst and subjecting the heated film to vacuum effective to distil the desired partial ester from the film. The evolved partial ester is condensed and cooled immediately upon being distilled from the film so that the entire separation is effected during a time interval insufficient for substantial reversion of the partial ester.

Distillation from a thin film is readily effected in a short time since, due to the thinness of the layer being distilled, substantially all molecules of partial ester readily find their way to the distilling surface and escape from the heated film. Thus, no portion of the mixture is subjected to local overheating nor held at an elevated temperature for an extended period of time.

The distillation is effected below the decomposition temperature of the catalyst. Distillation is preferably effected by causing successive small increments of the mixture to be distilled to flow along an evaporator surface so that distillation of any given increment is completed in a time less than five minutes and, in the case of high vacuum unobstructed path centrifugal distillation, the total distillation period for any given increment is less than one minute and usually only a few seconds.

Where the partial ester is separated from the catalyst simultaneously with unreacted alcohol by a single flash evaporation, the distillation which is of but a few seconds duration is effected at temperatures up to as high as 400° C. When controlled vacuum distillation is effected, however, as in high vacuum centrifugal distillation to distill substantially only the desired partial ester, the distillation is desirably effected below about 225° C. and preferably below about 200° C. since 10% reversion does not occur in less than about 10 minutes at 200° C. and commercial operations are readily carried out by means of high vacuum centrifugal distillation equipment at or below 200° C.

The distillation is carried out at a pressure effective to cause distillation of the desired partial ester from the film of mixture at the temperature employed. In most cases, it is desirable to employ a vacuum below about 100 microns mercury and preferably below about 50 microns with pressures of the order of 1–20 microns or less being desirably employed.

High vacuum centrifugal distillation is desirably employed for separating the partial ester because the mixture is readily spread in a thin film by centrifugal force and the molecules of partial esters are rapidly stripped from a film having a thickness below 5 mm. and preferably less than 1 mm.

It is often desirable before separating the partial ester to remove the unreacted excess alcohol from the mixture so that it does not subsequently distill off with the partial ester.

Alcohols such as glycerine may be separated by phase decantation during the reversion time interval with the last portion being preferably separated by a preliminary high vacuum distillation before distillation of the partial ester. In this way, since no substantial quantity of alcohol is formed by reversion during the distillation step, the partial ester recovered is of high purity, substantially uncontaminated by catalyst or alcohol.

An example of the invention in a preferred embodiment is the preparation and recovery of monoglyceride by alcoholysis of a fatty oil comprising a substantial proportion of triglyceride, such as soybean oil, with glycerine. Soybean oil is charged into a pot reactor with 2.3 moles of glycerol per mole of fatty material calculated as triglycerides. To the mixture is added 0.1% by weight of calcium oxide and the mixture is heated at 250°-260° C. for 30 minutes. The calcium oxide reacts with fatty acid present forming a metal soap which functions as ester-interchange catalyst. Under the reaction conditions, the maximum yield of monoglyceride is about 60% of theoretical yield. After reaction, the mixture is cooled to about 100° C. by passage through a cooling coil. The mixture then is allowed to stand for as much as one hour to allow unreacted glycerine to separate from the remainder of the mixture and a substantial amount of the unreacted glycerine is drawn off.

The mixture is then at once vacuum distilled in accordance with the invention on a high vacuum unobstructed path centrifugal still at 170° C. and 3 microns pressure and substantially all of the monoglyceride formed during the reaction is recovered.

The recovery of more than 90% and usually 95–100% of the monoglyceride formed is in contrast to yields below about 50% or as low as 25% obtained when the reaction mixture is allowed to cool slowly or stand for extended periods after reaction and/or the separation is effected by conventional vacuum pot distillation so that the reversion time interval is exceeded. Furthermore by stripping unreacted glycerine from the mixture before distilling the monoglyceride, a product containing less than 2% glycerine is obtained and, if desired, less than about 0.5% glycerine.

Similar results are obtained by reacting other fatty materials such as other fatty oils, tallow, fatty acids, and similar convertible fatty acid compounds with other alcohols in accordance with the invention. Other partial esters such as diglycerides may be obtained by means of the invention if desired. The partial esters formed by the reaction are not allowed to revert but are substantially completely recovered. The catalyst is retained in active form suitable for re-use. Large excesses of alcohol may be employed in the reaction to ensure optimum reaction conditions. Costly catalysts may be employed since they go through the process substantially unchanged. The invention further provides a simple, straight forward process for obtaining partial esters and particularly monoglyceride in enhanced yield and of exceptional purity.

While the invention has been described in considerable detail with reference to certain preferred embodiments thereof, it will be understood that variations and modifications may be effected within the spirit and scope of the invention as defined in the appended claims.

What I claim is:

1. The process which comprises reacting fatty material and glycerine in the presence of an ester-interchange catalyst and thereby forming an equilibrium composition including a substantial amount of monoglyceride, and thereafter recovering substantially all of said monoglyceride from said composition before elapse of the reversion time interval which is in the range below the maximum values of 2 minutes at 400° C., 10 minutes at 200° C. and 480 minutes at 100° C., said recovering being effected by cooling said composition and separating unreacted glycerine therefrom and thereafter, while said composition contains said catalyst in active form, separating said monoglyceride from said composition by progressively spreading said composition in a thin film and vacuum distilling monoglyceride from said film, both said separatings being completed within the reversion time interval.

2. The process which comprises reacting a triglyceride and glycerine at a temperature of 180°–300° C. and in the presence of a metal soap catalyst and thereby forming an equilibrium composition including a substantial amount of monoglyceride, and thereafter recovering substantially all of said monoglyceride from said composition by flash distilling said monoglyceride and glycerine from a thin film of said composition under vacuum and while said composition contains said catalyst in active form and thereafter separating said glycerine from the resulting product, both said flash distilling and said separating being completed within the reversion time interval having a range defined by the maximum values of 2 minutes at 400° C., 10 minutes at 200° C. and 480 minutes at 100° C.

3. The process which comprises reacting a triglyceride with glycerine at a temperature of 180°–300° C. and in the presence of a metal soap catalyst and thereby forming an equilibrium composition containing a substantial amount of monoglyceride, cooling said composition to about 100° C. and thereby separating unreacted glycerine from said composition, and thereafter, and while said composition contains said catalyst in active form, vacuum distilling monoglyceride from progressive thin film increments of said composition at a temperature below the decomposition temperature of said catalyst and a pressure below 100 microns Hg, said separating of unreacted glycerine and said distilling of monoglyceride both being completed before elapse of the reversion time interval having a maximum range of 2 minutes at 400° C., 10 minutes at 200° C., and 480 minutes at 100° C.

NOEL H. KUHRT.

REFERENCES CITED

The following references are of record in the file of this patent:

UNITED STATES PATENTS

| Number | Name | Date |
|---|---|---|
| 2,383,581 | Arrowsmith et al. | Aug. 28, 1945 |
| 2,496,328 | Bell et al. | Feb. 7, 1950 |